United States Patent [19]

Tuttle

[11] Patent Number: 5,787,991
[45] Date of Patent: Aug. 4, 1998

[54] ADJUSTABLE ANGLE RIDGER FOR A CULTIVATOR

[75] Inventor: James D. Tuttle, Sheffield, Iowa

[73] Assignee: Sukup Manufacturing Company, Sheffield, Iowa

[21] Appl. No.: 735,372

[22] Filed: Oct. 21, 1996

[51] Int. Cl.$^6$ ........................................ A01B 39/14
[52] U.S. Cl. ................ 172/194; 172/700; 172/701; 172/723; 172/736; 172/740; 172/749
[58] Field of Search ........................ 172/701, 730, 172/722–727, 736, 739, 740, 720, 700, 193, 194, 734, 733, 764, 749, 705, 683; 111/190; 37/366, 908

[56] References Cited

U.S. PATENT DOCUMENTS

| | | |
|---|---|---|
| 1,701,826 | 2/1929 | Sincock et al. |
| 1,800,152 | 4/1931 | Phillips et al. ............ 172/722 X |
| 2,033,168 | 3/1936 | Wright ........................... 37/366 |
| 2,453,723 | 11/1948 | Palmer et al. ................. 37/366 |
| 2,598,514 | 5/1952 | Denning ........................ 37/366 |
| 2,684,543 | 7/1954 | Cundiff, Sr. ............. 172/722 X |
| 2,784,507 | 3/1957 | Kinsinger ..................... 37/366 |
| 3,174,558 | 3/1965 | Nelson .......................... 172/722 |
| 3,187,822 | 6/1965 | Clifford et al. ............... 172/701 |
| 3,770,066 | 11/1973 | Young ..................... 172/722 X |
| 3,870,108 | 3/1975 | Orthman ....................... 172/722 |
| 4,560,011 | 12/1985 | Peterson et al. ........ 172/722 X |
| 4,828,041 | 5/1989 | Cosson ................... 172/701 X |
| 4,834,189 | 5/1989 | Peterson et al. ........ 172/722 X |
| 5,016,366 | 5/1991 | Watson ................... 37/366 X |

OTHER PUBLICATIONS

Brochure "Buffalo Cultivators 6000 Series" Aug. 1994—Fleischer Mfg. Inc., Columbus, Nebraska 68602-0848.
Brochure "Sukup Tobacco Special 9400 Cultivator" L11241-9511G—Sukup Mfg. Company Sheffield, Iowa 50475.
Brochure "Hiniker 5000 Cultivator"—Hiniker Co., Mankato, MN 56002.
Brochure "Orthman Compact Super-Sweep Cultivator"—Orthman Mfg. Inc., Lexington, Nebraska 68850-8894/2/88.
Brochure "Kinze Model 1500 Conservation Cultivators" Aug. 1992—Kinze Mfg. Co., Williamsburg, Iowa 52361.

*Primary Examiner*—Terry Lee Melius
*Assistant Examiner*—Christopher J. Novosad
*Attorney, Agent, or Firm*—Zarley, McKee, Thomte, Voorhees, & Sease

[57] ABSTRACT

An adjustable ridger for a cultivator includes an elongated ridger frame adapted to mount to the sweep member of the cultivator. The frame has a top bracket with an elongated slot extending therethrough. The slot has a width and a longitudinal axis. A plurality of setting holes in the top bracket are spaced apart along the longitudinal axis of the slot, each setting hole having a diameter greater than the width of the slot. A bottom bracket is spaced apart from the top bracket on the frame and has a guide hole therein. An elongated pull pin, having a stepped outer diameter with first and second diameter portions, is insertable through the slot in the top bracket and into the guide hole in the bottom bracket to act as a hinge pin. The second diameter portion is larger than the first diameter portion and yet smaller than the diameter of the setting holes. At least one wing pivotally mounts on the pull pin between the top and bottom brackets. Thus, the wing can be angularly adjusted relative to the frame by partially withdrawing the pull pin from the top bracket, moving it to a new setting hole, and allowing the second diameter portion of the spring-loaded pin to be urged into the desired setting hole. This adjustment mechanism does not require disassembly of the ridger wing assembly or removal of the pull pin from the guide hole.

20 Claims, 4 Drawing Sheets

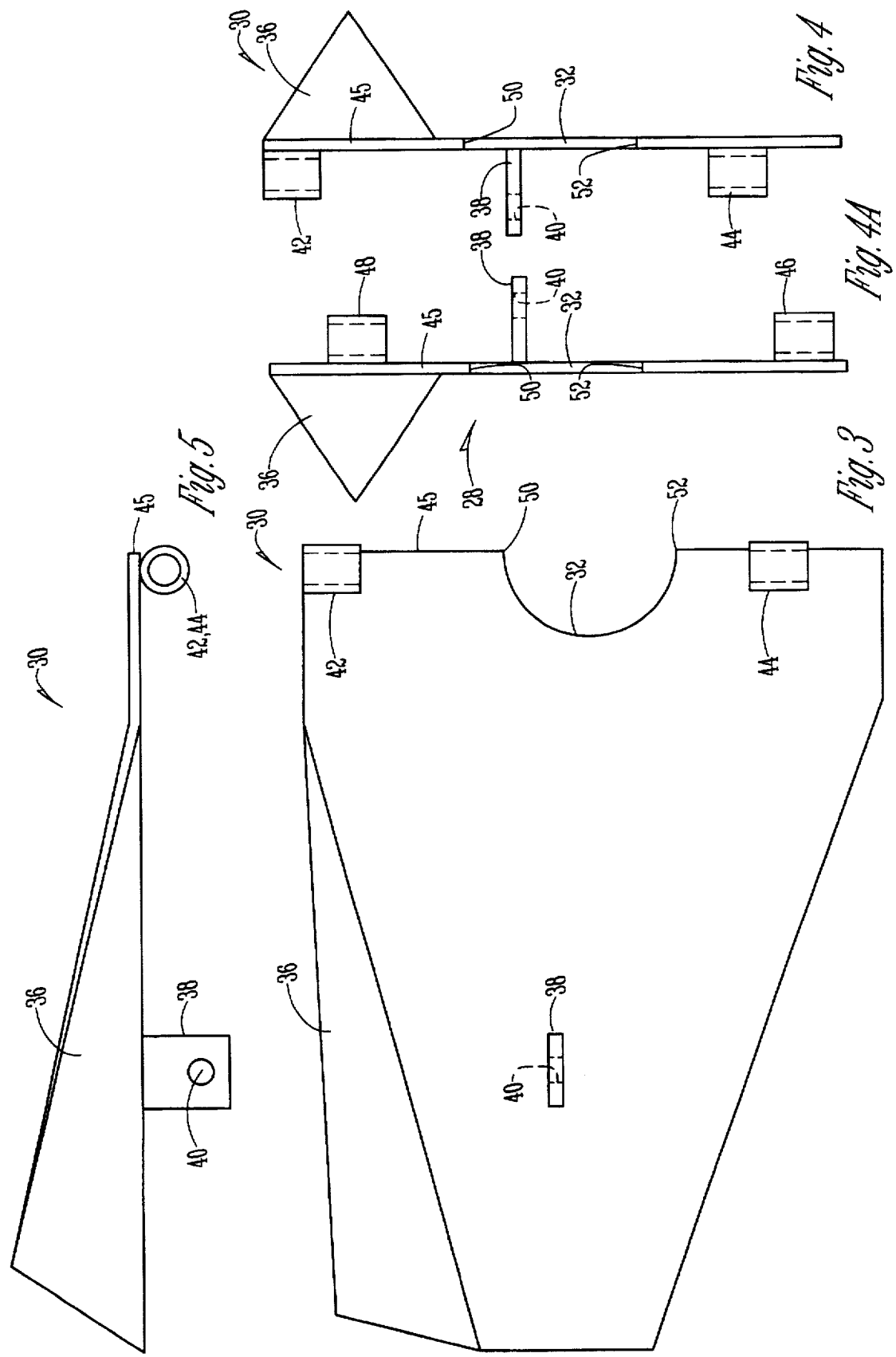

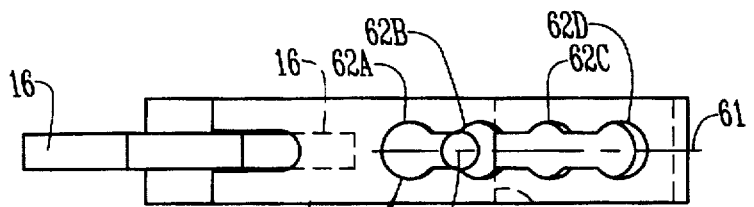
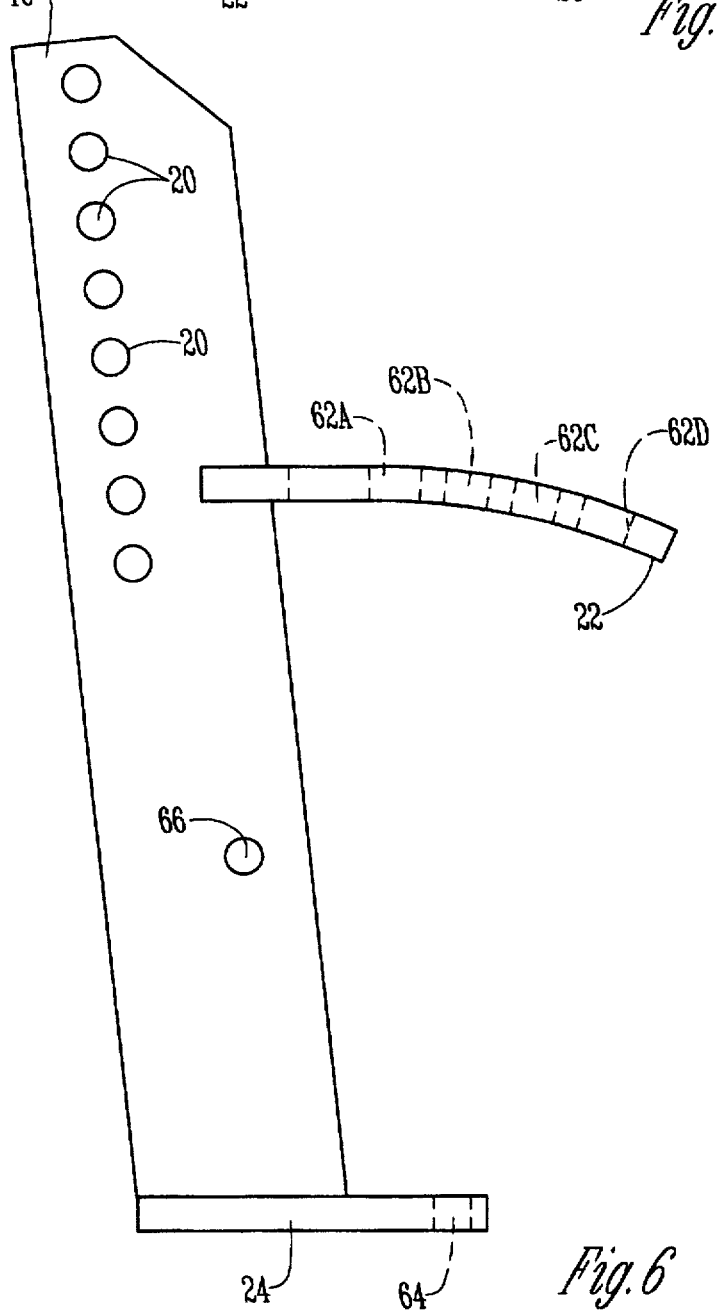
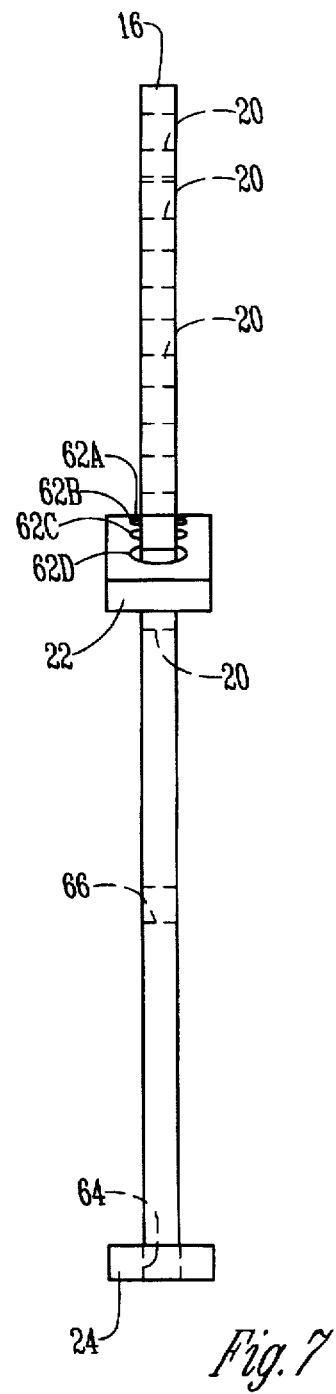

ADJUSTABLE ANGLE RIDGER FOR A CULTIVATOR

BACKGROUND OF THE INVENTION

The present invention relates to the field of agricultural equipment. In particular, this invention relates to an adjustable angle ridger for a cultivator. This invention provides a quick adjustment mechanism for changing the angle of the ridger with respect to a frame or a primary axis.

Conventional cultivators often utilize a sweep member with a ridger wing mounted thereon to assist in piling soil onto the ridges adjacent the furrow. The position of the ridger wing with respect to the sweep member helps determine the size and shape of the furrow. However, adjustment of the ridger wing on conventional ridger devices is time-consuming and difficult.

Existing ridger devices often use a pin-and-receiving-hole mechanism for angular adjustment of the ridger wing or, worse yet, the ridger wing is bolted in place and wrenches must be used for adjustments. Generally, the ridger is moved by completely withdrawing a pull pin from a hole corresponding to the current setting. Then the ridger wing is relocated and the pull pin is inserted into a different hole in the top adjusting bracket corresponding to the desired setting. Unfortunately, a considerable amount of disassembly, realignment and reassembly is required to move the pull pin. Parts can be lost, separated, or misplaced during this process. A quicker, more convenient way to adjust the ridger angle in the field is needed.

Therefore, a primary object of the present invention is the provision of an adjustable ridger assembly that is an improvement over existing adjustable ridger assemblies.

A further object of this invention is the provision of a quick-adjust mechanism for adjusting the angle of the ridger assembly with respect to the sweep member.

These and other objects will be apparent from the drawings, description, and claims which follow.

SUMMARY OF THE INVENTION

The present invention relates to an adjustable ridger for a cultivator. The adjustable ridger includes an elongated ridger frame adapted to mount to the sweep member of the cultivator.

The frame has a first bracket with an elongated slot extending therethrough. The slot has a width and a longitudinal axis. A plurality of setting holes in the first bracket are spaced apart along the longitudinal axis of the slot, each setting hole having a diameter greater than the width of the slot.

A second bracket is spaced apart from the first bracket on the frame and has a guide hole therein.

An elongated pull pin, having a stepped outer diameter with first and second diameter portions, is insertable through the slot in the first bracket and into the guide hole in the second bracket to act as a hinge pin. The second diameter portion is larger than the first diameter portion and yet smaller than the diameter of the setting holes.

At least one wing pivotally mounts on the pull pin between the first and second brackets. Thus, the wing can be angularly adjusted relative to the frame by partially withdrawing the pull pin from the first bracket, moving it to the desired setting hole, and allowing the spring to urge the second diameter portion into the desired setting hole. This adjustment mechanism does not require tools, disassembly of the ridger wing assembly or removal of the pull pin from the guide hole.

BRIEF DESCRIPTION OF THE DRAWINGS

FIG. 3 is a side elevation view of the ridger wing of this invention.

FIG. 4 is a front elevation view of the left ridger wing of FIG. 3.

FIG. 4A is a front elevation view of the right ridger wing which mates with the left ridger wing of FIG. 4.

FIG. 5 is a top view of the ridger wing of FIG. 3.

FIG. 6 is a side elevation view of the ridger wing frame member of FIG. 2.

FIG. 7 is a rear elevation view of the ridger wing frame member of FIG. 2.

FIG. 8 is a top view of the ridger wing frame member of FIG. 2.

DETAILED DESCRIPTION OF THE PREFERRED EMBODIMENT

Figure 1:
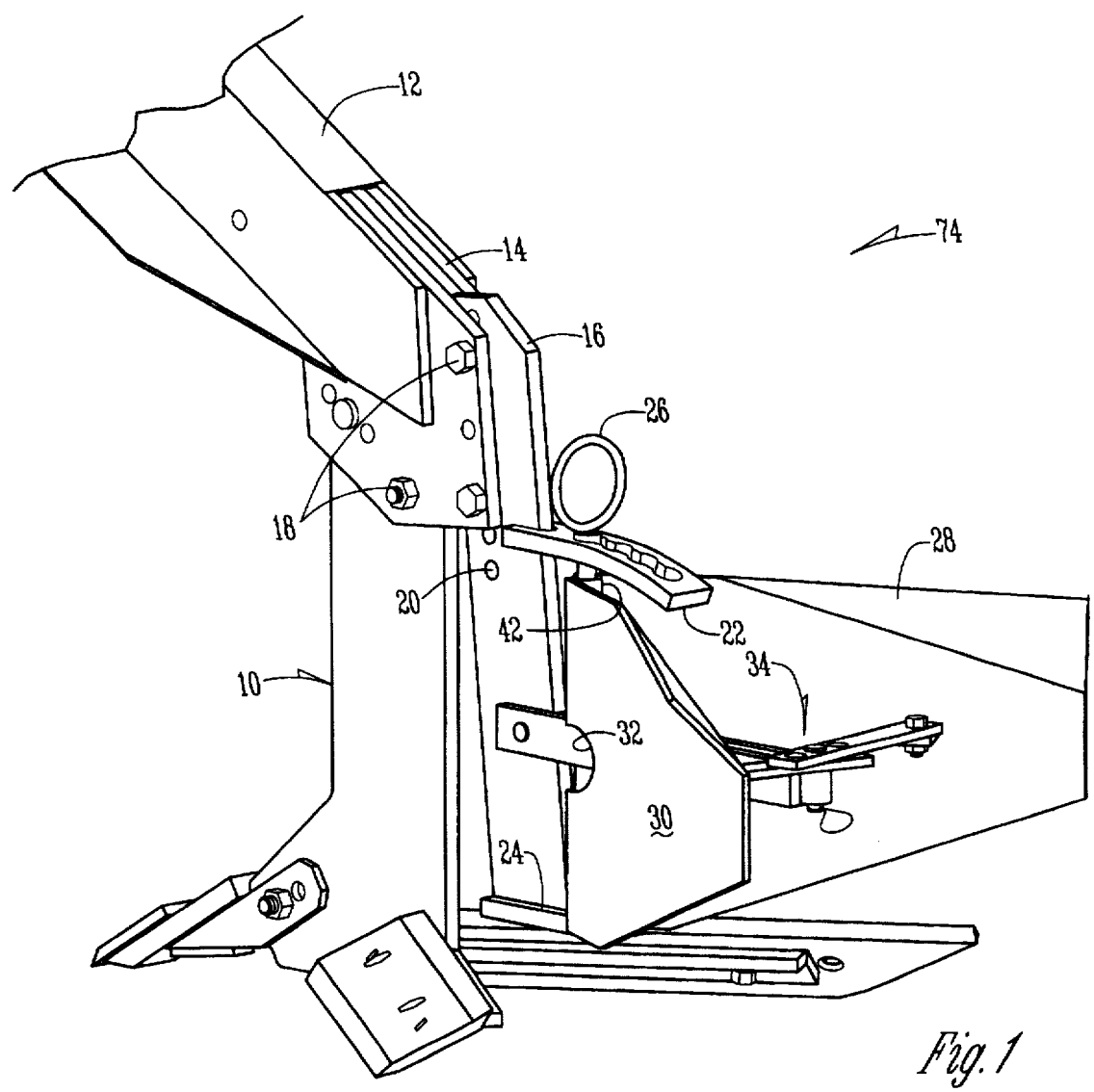
FIG. 1 is a perspective view of the adjustable angle ridger of the present invention mounted on a sweep member of a cultivator.

FIG. 1 shows a sweep member 10 which can be mounted to the tool arm 12 of a cultivator (not shown). The sweep member 10 is sandwiched between a pair of spaced apart mounting plates 14 which extend from the rear of the tool arm 12. A ridger frame member 16 is also sandwiched between the mounting plates 14 rearwardly of the sweep member 10. Fasteners 18 secure the sweep member 10 and the ridger frame member 16 to the mounting plates 14 and thereby to the tool arm 12. A plurality of holes 20 in the elongated ridger frame member 16 provide vertical adjustability of the frame member 16 with respect to the sweep member 10 and the tool arm 12.

Figure 2:
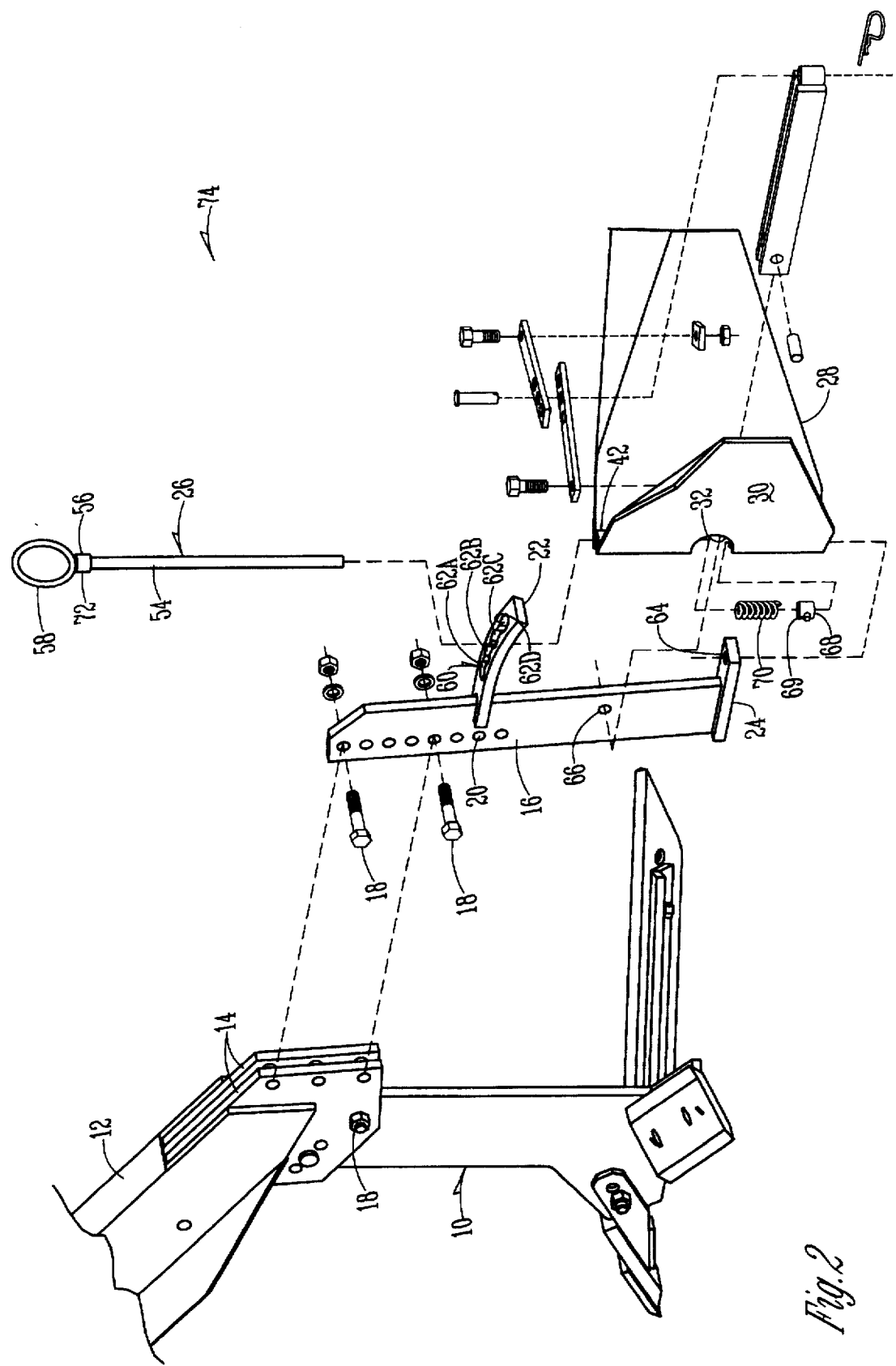
FIG. 2 is an exploded assembly view of the adjustable angle ridger of FIG. 1.

The frame member 16 has top and bottom brackets 22, 24 extending in a generally horizontal direction rearwardly therefrom (see FIG. 2 also). As will be explained in greater detail below, the top bracket 22 constitutes an adjusting bracket. As best seen in FIG. 2, the bottom bracket 24 constitutes a guide bracket for receiving and guiding the end of an elongated, straight pull pin 26.

Referring again to FIG. 1, the pull pin 26 pivotally connects right and left wings 28, 30 to the frame member 16 through the brackets 22, 24. The right and left wings 28, 30 each include an aperture 32 located at the forward or leading edge of the wing between the top and bottom thereof. As seen in FIGS. 1 and 2, the aperture accommodates a wingspread adjustment mechanism 34 that is pivotally connected to the frame member 16 between the top and bottom brackets 22, 24.

FIGS. 3, 4, 5 illustrate the structure of the left wing 30. The top of the wing 30 has a bent portion 36 for deflecting dirt. This portion 36 extends to the rear of the wing 30, as shown in FIG. 3. A tab 38 is disposed on the inwardly facing surface of the wing 30 and has a hole 40 therein for connecting the wing to the wingspread adjustment mechanism 34.

Tubular sleeves 42, 44 are provided adjacent the leading edge 45 of the wing 30. The tubular sleeve 42 is disposed at the top of the wing 30 above the aperture 32, while the tubular sleeve 44 is disposed below the aperture 32 and far enough above the bottom of the wing to accommodate a tubular sleeve 46 therebetween (see FIG. 4A).

FIG. 4A shows the right wing 28 which pivotally mates with the left wing 30. The right wing 28 is a mirror image of the left wing 30, except the tubular sleeves 46, 48 are located complementary to the sleeves 42,44 as shown in FIG. 4A. Therefore, the tubular sleeves 42, 44, 46, 48 register with each other to form a hinge sleeve. The hinge sleeve formed by 42, 44, 46, 48 receives the hinge pin or pull pin 26 so as to pivotally connect the wings 28, 30 to each other and to the frame member 16 in an adjustable manner, as further described below.

FIGS. 3–5 illustrate that the tab 38 is generally aligned with the aperture 32 (between the top edge 50 and the bottom edge 52 of the aperture 32) so as to accommodate the wingspread adjustment mechanism 34.

Referring again to FIG. 2, the pull pin 26 includes a first diameter or hinge pin portion 54 and an enlarged second diameter or locking portion 56.

FIGS. 6–8 show the frame member 16 and the brackets 22, 24 attached thereto. The top bracket 22 is attached to the frame member 16 by welding or other suitable conventional means. The free end of the top bracket 22 is curved downwardly such that the radial distance between the bottom bracket 24 and the top bracket 22 remains relatively constant along the length of the bracket 22.

The free end of the top bracket 22 includes a longitudinally extending slot 60 therethrough. The slot 60 has a central longitudinal axis 61 (see FIG. 8), which is preferably coincidental with the central longitudinal axis of the top bracket 22. A plurality of setting holes 62A, 62B, 62C, 62D, etc. are spaced apart along the central longitudinal axis 61 of the slot 60, as best seen in FIG. 8. In the preferred embodiment, the holes 62A–62D extend completely through the thickness of the top bracket 22 and do not meet except for the communication provided by the slot 60. However, it is contemplated that the setting holes 62A–62D could extend only partially through the bracket 24 without detracting from the invention. The holes 62A–62D would merely be counterbores at the entrance of the slot 60. Also, the holes could overlap, but it is not recommended that the width of the overlap exceed the width of the slot 60.

Preferably, the holes 62A–62D are equally spaced along the axis 61 of the slot 60. However, it is contemplated that tighter or wider spacing would not detract from the invention. In fact, it is contemplated that the holes 62A–62D could overlap to such an extent that the overlap itself defines the slot 60. The holes 62A–62D are sized to slidably receive the enlarged diameter portion 56 of the pull pin 26.

The bottom bracket 24 is integrally formed with or welded or otherwise suitably attached to the bottom of the frame member 16. The free end of the bottom bracket 24 extends rearwardly from the frame member 16 as shown in FIG. 6. The free end of the bottom bracket 24 includes a substantially vertical guide hole 64 therein, preferably therethrough. The guide hole 64 is sized to slidably receive and guide the first diameter portion 54 of the pull pin 26. To avoid inadvertently pulling out the pull pin 26 from the hole 64, the depth of the holes 62A–62D and/or the thickness of the free end of the top bracket 22 should be less than the thickness of the bottom bracket 24 surrounding the guide hole 64. Alternatively, the length of the pin 26 can be chosen so that the pin 26 protrudes sufficiently through the guide hole 64 to prevent it from being dislodged inadvertently.

A hole 66 is provided in a frame member 16 between the top and bottom brackets 22, 24 for pivotally attaching the wingspread adjustment mechanism 34 to the frame member 16.

A shaft collar or stop member 68 is detachably mounted on the pull pin 26 by a set screw 69 after a spring 70, such as a coil spring, is installed around the pull pin 26. The spring 70 and the adjustable stop member 68 installed on the pull pin 26 constitute a spring mechanism for preloading the second diameter portion into the setting holes 62A–62D. The stop member 68 and the spring 70 have inside diameters sufficient to slidingly receive the first diameter portion 54 of the pull pin 26. The axial length and position of the stop member 68 can be selected so as to take up the gap between the spring 70 and the tubular sleeves 44 or 48 and provide the desired preload on the pin 26. The spring rate of the spring 70 can also be selected to achieve the desired results.

The first and second diameter portions 54, 56 of the pull pin 26 are preferably adjacent to each other and a step 72 is interposed therebetween. When the holes 62A–62D are counterbores, the step 72 could be utilized to perform the retention function. However, in the preferred embodiment the step 72 eventually abuts the top of the tubular sleeve 42 on the wing 28, 30 to prevent the pin 26 from slipping through. Those skilled in the art will recognize that the retention function could also be accomplished by the ring portion 58 if it has a cross-section larger than the slot 60.

The adjustable angle ridger 74 of this invention is assembled as shown in FIG. 2. The assembler brings the leading (aperture bearing) edges of the wings 28, 30 together so that the tubular sleeves 42, 44, 46 and 48 are registered with each other and the apertures 32 and the top edge of the wings 28, 30 are also aligned.

Next, the joined wings 28, 30 are positioned between the top and bottom brackets 22, 24 such that the tubular sleeves 42, 44, 46, 48 register with the hole 64 in the bottom bracket. Then the joined wings 28, 30 are inclined rearwardly until the tubular sleeve 42 registers with the hole 62A in the top bracket 24. The assembler can then install the pull pin 26 by inserting the smaller diameter portion 54 through the tubular sleeves 42 and 48. The stop member 68 and a spring 70 are then loosely installed around the pin 26 between the tubular sleeves 44 and 48 as described above. The position of the shaft collar 68, the length of the shaft collar 68, and the spring rate of the spring 70 help determine the preload of the wings 28, 30 toward the top bracket 22 and the force required to withdraw the pin 26 from the setting holes 62A–62D.

Once the spring mechanism is loosely in place, the pin 26 is extended through the rest of the sleeves 44,46 and into the guide hole 64 in the bottom bracket 24. The step 72 on the pin 26 eventually abuts the sleeve 42 and prevents the pull pin 26 from dropping any further through. Now the set screw 69 is tightened to fix the stop member or shaft collar 68 for axial movement with the pin 26.

In use, the adjustable angle ridger 74 is mounted to the rear of the sweep member 10 of the tool arm 12, as shown in FIGS. 1 and 2. To change the angle of inclination with respect to the frame member 16, and thereby the tool arm 12 and sweep member 10, the user pulls the pin 26 upwardly against the force of the spring 70 until the enlarged diameter portion 56 clears the top bracket 24. Then the user moves the ring portion 58 of the pull pin 26 rearwardly through the slot 60 in the top bracket 22 until the pin 26 registers with the desired setting hole 62A–62D. During this time, the first diameter portion 54 of pin 26 remains seated in the guide hole 64. The pin 26 need only be pulled high enough to allow the enlarged diameter portion 56 to clear the top bracket 22. Disassembly of the ridger wing assembly is not required. When over the desired setting hole, the pin 26 can be released and the force of the spring 70 pulls it down until the step 72 contacts the top sleeve 42. No tools are required.

One skilled in the art will appreciate that the present invention can be adapted to a single or multiple wing ridger and can be used with a variety of different wingspread adjustment mechanisms. The present invention can also be adapted to provide angular movement in almost any direction by positioning the longitudinal axis of the slot 60 accordingly relative to the frame member 16, tool arm 12, and the sweep member 10.

Therefore, it can be seen that present invention at least accomplishes its stated objects.

What is claimed is:

1. An adjustable ridger for a cultivator having a sweep member, the ridger comprising:

an elongated ridger frame adapted to mount to the sweep member of the cultivator;

a top bracket on the frame having an elongated slot extending therethrough, the slot having a width and a longitudinal axis, a plurality of setting holes in the top bracket being spaced apart along the longitudinal axis of the slot, each setting hole having a diameter greater than the width of the slot;

a bottom bracket spaced apart from the top bracket on the frame and having a guide hole therein;

an elongated pull pin having a stepped outer diameter with first and second diameter portions, the first diameter portion of the pull pin being insertable through the slot in the top bracket and into the guide hole in the bottom bracket, the second diameter portion being enlarged with respect to the first diameter portion and less than the diameter of the setting holes;

at least one wing pivotally mounted on the pull pin between the top and bottom brackets;

whereby, when the second diameter portion of the pull pin is initially disposed in one of the setting holes in the top bracket, the wing can be moved relative to the frame by partially withdrawing the pull pin from the top bracket until the second diameter portion clears said setting hole and aligning the first diameter portion with the slot without completely removing the pull pin from the guide hole, then moving the pull pin from the initial setting hole to a new setting hole through the slot therebetween, and inserting the second diameter portion of the pull pin into the new setting hole.

2. The adjustable ridger of claim 1 wherein the first and second diameter portions of the pull pin are axially adjacent to each other.

3. The adjustable ridger of claim 1 wherein the pull pin has an end with a ring portion thereon.

4. The adjustable ridger of claim 1 wherein the pull pin is substantially straight.

5. The adjustable ridger of claim 1 wherein the wing has upper and lower edges and an aperture disposed therebetween adapted to receive a wingspread adjustment mechanism therethrough.

6. The adjustable ridger of claim 1 comprising two wings each having at least one hinge sleeve member thereon, the hinge sleeve members on the respective wings being axially alignable and pivotally joinable by the pull pin.

7. The adjustable ridger of claim 1 further comprising a spring mechanism including a stop member secured to the pull pin for axial movement therewith and a spring disposed around the pull pin adjacent the stop member.

8. The adjustable ridger of claim 7 wherein the spring mechanism is position adjustable with respect to the pull pin and is interposed between the hinge sleeve members.

9. The adjustable ridger of claim 7 wherein the wing has upper and lower edges and an aperture disposed therebetween adapted to receive a wingspread adjustment mechanism therethrough, the spring mechanism extending across the aperture.

10. The adjustable ridger of claim 7 wherein the spring is a coil spring.

11. The adjustable ridger of claim 1 wherein the slot and the setting holes extend through the top bracket in a substantially vertical direction.

12. The adjustable ridger of claim 1 wherein the guide hole extends through the bottom bracket in a vertical direction.

13. The adjustable ridger of claim 1 wherein the top and bottom brackets are rigidly mounted to the frame.

14. The adjustable ridger of claim 1 wherein the top bracket is elongated and extends in a generally horizontal direction away from the frame.

15. The adjustable ridger of claim 1 wherein the top bracket curves downwardly so as to have an arcuate vertical longitudinal cross section.

16. The adjustable ridger of claim 1 wherein the top bracket curves downwardly so as to have an arcuate vertical longitudinal cross section, the top bracket spaced from the bottom bracket by a substantially constant radial distance.

17. The adjustable ridger of claim 1 wherein the bottom bracket is elongated and extends in a generally horizontal direction away from the frame.

18. The adjustable ridger of claim 1 wherein the setting holes are equally spaced along the longitudinal axis of the slot.

19. An adjustment mechanism for a cultivator ridger comprising:

a frame;

a first bracket on the frame having an elongated slot extending therethrough, the slot having a width and a longitudinal axis, a plurality of setting holes in the top bracket being spaced apart along the longitudinal axis of the slot, each setting hole having a diameter greater than the width of the slot;

a second bracket spaced apart from the first bracket on the frame and having a guide hole therein;

an elongated pull pin having a stepped outer diameter with first and second diameter portions, the first diameter portion of the pull pin being insertable through the slot in the first bracket and into the guide hole in the second bracket, the second diameter portion being enlarged with respect to the first diameter portion and less than the diameter of the setting holes;

a ridger wing slidably and pivotally mounted on the pull pin between the first and second brackets;

a spring mechanism interposed between the pull pin and the wing to normally urge the second diameter portion of the pull pin into the setting holes and maintain the pull pin in the guide hole;

whereby the wing can be selectively moved from a first angle relative to the frame to a second angle relative to the frame by pulling and moving the pull pin from one setting hole to another setting hole without completely removing the pull pin from the guide hole.

20. The adjustment mechanism of claim 19 wherein the setting holes are equally spaced along the longitudinal axis of the slot.

* * * * *